US012798173B2

(12) United States Patent
Kitayama et al.

(10) Patent No.: US 12,798,173 B2
(45) Date of Patent: Nov. 17, 2026

(54) METHOD FOR PRODUCING STRETCHED FILM

(71) Applicant: KANEKA CORPORATION, Osaka (JP)

(72) Inventors: Fuminobu Kitayama, Settsu (JP); Arihiro Saito, Settsu (JP); Tetsuo Okura, Settsu (JP); Toshifumi Matsumiya, Settsu (JP); Masahide Shinobu, Settsu (JP)

(73) Assignee: KANEKA CORPORATION, Osaka (JP)

( * ) Notice: Subject to any disclaimer, the term of this patent is extended or adjusted under 35 U.S.C. 154(b) by 144 days.

(21) Appl. No.: 18/846,811

(22) PCT Filed: Mar. 15, 2023

(86) PCT No.: PCT/JP2023/010015
§ 371 (c)(1),
(2) Date: Sep. 13, 2024

(87) PCT Pub. No.: WO2023/189584
PCT Pub. Date: Oct. 5, 2023

(65) Prior Publication Data
US 2026/0109105 A1 Apr. 23, 2026

(30) Foreign Application Priority Data
Mar. 29, 2022 (JP) ................................ 2022-054405
Mar. 29, 2022 (JP) ................................ 2022-054406

(51) Int. Cl.
*B29C 55/04* (2006.01)
*B29C 35/04* (2006.01)
(Continued)

(52) U.S. Cl.
CPC ............ *B29C 55/12* (2013.01); *B29C 35/045* (2013.01); *B29C 35/0805* (2013.01);
(Continued)

(58) Field of Classification Search
CPC ............ B29C 35/045; B29C 2035/046; B29C 2035/0822; B29C 48/0018; B29C 55/04;
(Continued)

(56) References Cited

U.S. PATENT DOCUMENTS 5,917,002 A 6/1999 Doi et al.
2002/0061583 A1 * 5/2002 Kawamura ............ C08L 67/02 435/255.1
(Continued)

FOREIGN PATENT DOCUMENTS

JP 6-336523 A 12/1994
JP 10-110047 A 4/1998
(Continued)

OTHER PUBLICATIONS

International Search Report issued on Jun. 6, 2023, in PCT/JP2023/010015 filed on Mar. 15, 2023, 3 pages.

*Primary Examiner* — Leo B Tentoni
(74) *Attorney, Agent, or Firm* — Oblon, McClelland, Maier & Neustadt, L.L.P.

(57) ABSTRACT

In a method for producing a stretched film by stretching a film web containing a poly(3-hydroxybutyrate) resin, the film web is stretched under conditions where a film surface maximum temperature is within a temperature range represented by the following inequality:
Tm-60≤film surface maximum temperature (° C.)≤Tm-5, where the Tm is a melting point (° C.) of the film web.

20 Claims, 1 Drawing Sheet

(51) Int. Cl.

| | |
|---|---|
| ***B29C 35/08*** | (2006.01) |
| ***B29C 48/00*** | (2019.01) |
| ***B29C 55/06*** | (2006.01) |
| ***B29C 55/12*** | (2006.01) |
| ***B29C 55/14*** | (2006.01) |
| ***B29C 55/16*** | (2006.01) |
| *B29C 55/28* | (2006.01) |
| *B29K 67/00* | (2006.01) |
| *B29K 105/00* | (2006.01) |

(52) U.S. Cl.

CPC ........ *B29C 48/0018* (2019.02); *B29C 55/143* (2013.01); *B29C 55/146* (2013.01); *B29C 2035/046* (2013.01); *B29C 2035/0822* (2013.01); *B29C 55/28* (2013.01); *B29K 2067/04* (2013.01); *B29K 2105/0067* (2013.01); *B29K 2105/0085* (2013.01); *B29K 2995/004* (2013.01)

(58) Field of Classification Search

CPC ......... B29C 55/06; B29C 55/12; B29C 55/14; B29C 55/143; B29C 55/146; B29C 55/16; B29C 55/28; B29K 2067/04; B29K 2105/0067; B29K 2105/0085

USPC ....... 264/210.1, 210.7, 288.4, 290.2, 331.21, 264/492, 564

See application file for complete search history.

(56) References Cited

U.S. PATENT DOCUMENTS

| | | | | |
|---|---|---|---|---|
| 2006/0055081 | A1 | 3/2006 | Iwata et al. | |
| 2009/0325854 | A1* | 12/2009 | Funk | C08J 5/18 264/211 |

FOREIGN PATENT DOCUMENTS

| | | | | |
|---|---|---|---|---|
| JP | 10-176070 A | 6/1998 | | |
| JP | 2000-502298 A | 2/2000 | | |
| JP | 2003-311824 A | 11/2003 | | |
| JP | 2003-311825 A | 11/2003 | | |
| JP | 2006-168159 A | 6/2006 | | |
| JP | 2012-126065 A | 7/2012 | | |
| JP | 2016-221803 A | 12/2016 | | |
| WO | WO-9722459 A1 * | 6/1997 | | B29C 55/28 |

* cited by examiner

METHOD FOR PRODUCING STRETCHED FILM

CROSS-REFERENCE TO RELATED APPLICATIONS

The present application is a 35 U.S.C. § 371 national stage patent application of International patent application PCT/JP2023/010015, filed on Mar. 15, 2023, which is based on and claims the benefits of priority to Japanese Application No. 2022-054405, filed on Mar. 29, 2022, and Japanese Application No. 2022-054406, filed on Mar. 29, 2022. The entire contents of all of the above applications are incorporated herein by reference.

TECHNICAL FIELD

The present invention relates to a method for producing a stretched film containing a poly(3-hydroxy butyrate) resin.

BACKGROUND ART

Separate collection and composting of raw garbage have recently been promoted especially in Europe, and there is a demand for plastic products that can be composted together with raw garbage.

Additionally, environmental problems caused by waste plastics have become an issue of great concern. In particular, it has been found that a huge amount of plastics dumped at seas or carried into seas through rivers etc. are drifting in the ocean on a global scale. Such plastics, which retain their shapes for a long period of time, are pointed out as having various harmful effects on the ecosystems, and examples of plastics-induced problems include: a phenomenon called ghost fishing where plastics catch or trap marine creatures; and eating disorder from which marine creatures having ingested plastics suffer due to the plastics remaining in their digestive organs.

There is also known a problematic phenomenon where plastics are broken into microplastic particles by the action of ultraviolet rays or any other cause, then the microplastic particles adsorb hazardous compounds present in seawater, and marine creatures ingest the microplastic particles with the adsorbed compounds, so that hazardous substances are introduced into the food chain.

The use of biodegradable plastics is expected as means for addressing the plastics-induced marine pollution as described above. However, a report issued by the United Nations Environment Programme in 2015 states that plastics such as polylactic acid that can be biodegraded through composting are not expected to be degraded quickly in the actual ocean whose temperature is low and cannot therefore be used as a countermeasure against the marine pollution.

Under these circumstances, poly(3-hydroxybutyrate) resins, which are biodegradable even in seawater, are attracting attention as materials that can be a solution to the above problems.

A known technique for producing a thin, high-strength film is to stretch a resin film at a temperature equal to or higher than the glass transition temperature of the resin.

However, poly(3-hydroxy butyrate) resins are difficult to stretch under usual stretching conditions due to their characteristics. To solve this problem, various techniques have been investigated.

For example, Patent Literature 1 is directed to achieving stretching of a poly(3-hydroxy butyrate) resin-containing film and describes a method for producing a stretched film. In this method, a thermoplastic resin containing a poly(3-hydroxy butyrate) resin as a main component is molded into a film, then the film is subjected to first stretching in which the film is rolled in a temperature range of 20 to 90 °C, and the film is further subjected to second stretching in which the film is stretched in a temperature range of 30 to 90 °C in the same direction as in the first stretching.

Patent Literature 2 also describes a method for producing a stretched film. In this method, a molten film prepared using a poly(3-hydroxy butyrate) resin as a raw material is processed into an amorphous film, and then the amorphous film is cold-stretched at a temperature (in particular, 3 °C) equal to or lower than a temperature 20 °C above the glass transition temperature of the resin.

Patent Literature 3 describes a method for producing a stretched film by stretching a film in a temperature range of 40 to 90 °C. The film to be stretched is made of a blend of 3-hydroxy butyrate-3-hydroxyvalerate copolymer, which is a poly(3-hydroxy butyrate) resin, with at least 20 wt % poly(ε-caprolactone).

CITATION LIST

Patent Literature

PTL 1: Japanese Laid-Open Patent Application Publication No. 2006-168159

PTL 2: Japanese Laid-Open Patent Application Publication No. 2003-311824

PTL 3: Japanese Laid-Open Patent Application Publication No. H10-110047

SUMMARY OF INVENTION

Technical Problem

The method described in Patent Literature 1 requires a two-stage stretching step including first stretching performed by rolling and second stretching performed at a high temperature in order to stretch a film in one direction. This makes the production process complicated.

In the method described in Patent Literature 2, an amorphous film needs to be prepared and then stretched. The amorphous film easily sticks to a device such as a stretching roll used to stretch the film, and this makes it impossible to achieve high productivity.

In the method described in Patent Literature 3, 20 wt % or more poly(ε-caprolactone) needs to be contained in a resin component, and only up to 80 wt % poly(3-hydroxy butyrate) resin can be used in the resin component. This limits the composition of the film.

In view of the above circumstances, the present invention aims to provide a method for producing a stretched film, the method being adapted to stretch a poly(3-hydroxy butyrate) resin-containing film at high productivity.

Solution to Problem

As a result of intensive studies with the goal of solving the above problem, the present inventors have found that a poly(3-hydroxybutyrate) resin-containing film can be stretched at high productivity by controlling the temperature condition in a given range when stretching a poly(3-hydroxybutyrate) resin-containing film web. Based on this finding, the inventors have completed the present invention.

Specifically, the present invention relates to a method for producing a stretched film by stretching a film web containing a poly(3-hydroxy butyrate) resin, the method including the step of:

stretching the film web under conditions where a film surface maximum temperature is within a temperature range represented by the following inequality (1):

$$Tm-60 \leq \text{film surface maximum temperature (°C)} \leq Tm-5, \quad (1)$$

the Tm is a melting point (C) of the film web.

Another aspect of the present invention is a method for producing a biaxially-stretched film by biaxially stretching a film web containing a poly(3-hydroxy butyrate) resin, the method including the steps of:

(i) stretching the film web in a given direction, and (ii) stretching the film web in a direction perpendicular to the given direction under conditions where a film surface maximum temperature is within a temperature range represented by the following inequality (1):

$$Tm-60 \leq \text{film surface maximum temperature (°C)} \leq Tm-5, \quad (1)$$

the Tm is a melting point (° C.) of the film web.

Advantageous Effects of Invention

The present invention can provide a method for producing a stretched film, the method being adapted to stretch a poly(3-hydroxy butyrate) resin-containing film at high productivity. The stretched film may be a uniaxially-stretched film or a biaxially-stretched film.

According to a preferred aspect of the present invention, a poly(3-hydroxybutyrate) resin-containing stretched film can be produced by a continuous process at high productivity.

DESCRIPTION OF EMBODIMENTS

Figure 1:
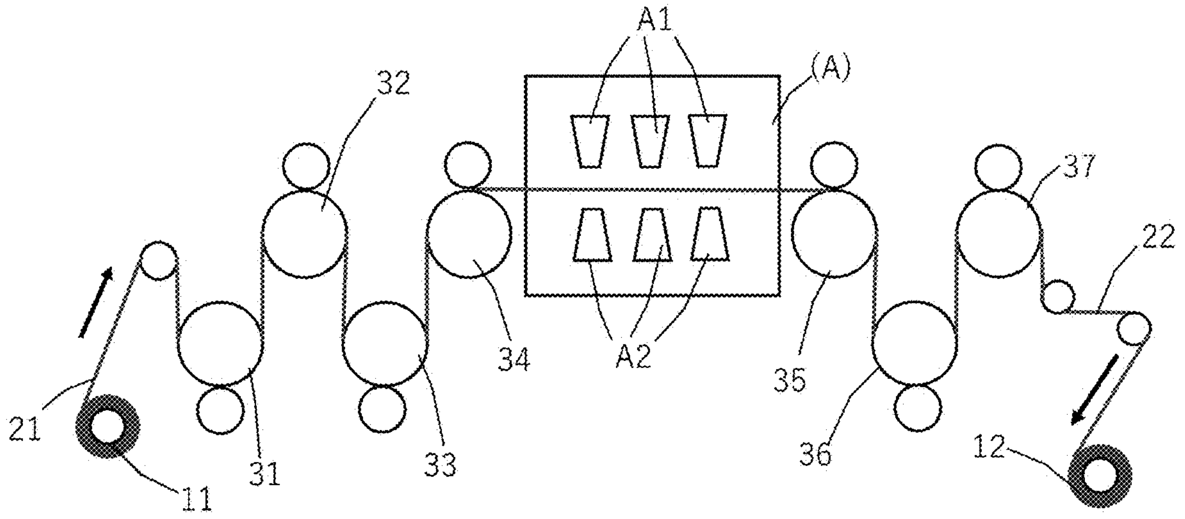
FIG. 1 is a conceptual diagram showing an example of a production line for continuous film stretching according to one aspect of the present invention.

Hereinafter, an embodiment of the present invention will be described. The present invention is not limited to the embodiment described below.

The present embodiment relates to a method for producing a stretched film by stretching a film web containing a poly(3-hydroxybutyrate) resin. The film web will be described first.

<Film Web>

The film web contains a poly(3-hydroxybutyrate) resin as a main resin component.

The poly(3-hydroxybutyrate) resin is an aliphatic polyester resin that can be produced from a microorganism and that contains 3-hydroxybutyrate as repeating units. The poly(3-hydroxy butyrate) resin may be poly(3-hydroxy butyrate) which contains only 3-hydroxy butyrate as repeating units or may be a copolymer of 3-hydroxy butyrate and another hydroxyalkanoate. The poly(3-hydroxybutyrate) resin may be a mixture of a homopolymer and one or more copolymers or may be a mixture of two or more copolymers.

Specific examples of the poly(3-hydroxy butyrate) resin include poly(3-hydroxy butyrate), poly(3-hydroxy butyrate-co-3-hydroxyhexanoate), poly(3-hydroxy butyrate-co-3-hydroxyvalerate), poly(3-hydroxy butyrate-co-4-hydroxy butyrate), poly(3-hydroxy butyrate-co-3-hydroxyoctanoate), and poly(3-hydroxy butyrate-co-3-hydroxyoctadecanoate). Among these, poly(3-hydroxy butyrate), poly(3-hydroxy butyrate-co-3-hydroxyhexanoate), poly(3-hydroxy butyrate-co-3-hydroxyvalerate), and poly(3-hydroxy butyrate-co-4-hydroxy butyrate) are preferred since they are easy to industrially produce.

Poly(3-hydroxy butyrate-co-3-hydroxyhexanoate) is more preferred for the following reasons: the ratio between the repeating units can be varied to change the melting point and crystallinity and thus adjust the physical properties such as Young's modulus and heat resistance to levels intermediate between those of polypropylene and polyethylene; and this plastic is easy to industrially produce and useful in terms of physical properties. Poly(3-hydroxy butyrate) resins are thermally decomposed easily by heating at 180 °C or higher and, in particular, poly(3-hydroxy butyrate-co-3-hydroxyhexanoate) can have a low melting point and be moldable at low temperature. Poly(3-hydroxy butyrate-co-3-hydroxyhexanoate) is preferred also in this respect.

Examples of commercially-available poly(3-hydroxy butyrate-co-3-hydroxyhexanoate) include "Kaneka Biodegradable Polymer Green Planet™" of Kaneka Corporation.

The properties such as melting point and Young's modulus of poly(3-hydroxy butyrate-co-3-hydroxyvalerate) can be changed depending on the ratio between the 3-hydroxy butyrate component and the 3-hydroxyvalerate component. However, the crystallinity of poly(3-hydroxy butyrate-co-3-hydroxyvalerate) is as high as 50% or more because the two components are co-crystallized. Thus, poly(3-hydroxy butyrate-co-3-hydroxyvalerate), albeit being more flexible than poly(3-hydroxy butyrate), cannot offer sufficient improvement in terms of brittleness.

When the poly(3-hydroxy butyrate) resin includes a copolymer of 3-hydroxy butyrate units and other hydroxyalkanoate units, the average content ratio between the 3-hydroxy butyrate units and the other hydroxyalkanoate units (3-hydroxy butyrate units/other hydroxyalkanoate units) in total monomer units constituting the poly(3-hydroxy butyrate) resin is preferably from 99/1 to 80/20 (mol %/mol %) and more preferably from 97/3 to 85/15 (mol %/mol %) in terms of ensuring both the strength of the stretched film and the film productivity.

The average content ratio between different monomer units in total monomer units constituting the poly(3-hydroxy butyrate) resin can be determined by a method known to those skilled in the art, such as a method described in paragraph of WO 2013/147139. The "average content ratio" refers to a molar ratio between different monomer units in total monomer units constituting the poly(3-hydroxybutyrate) resin. When the poly(3-hydroxy butyrate) resin is a mixture of two or more poly(3-hydroxy butyrate) resins, the average content ratio refers to a molar ratio between different monomer units contained in the total mixture.

The poly(3-hydroxy butyrate) resin may be a mixture of at least two poly(3-hydroxy butyrate) resins differing in the types and/or contents of constituent monomers.

In this case, at least one high-crystallinity poly(3-hydroxy butyrate) resin and at least one low-crystallinity poly(3-hydroxy butyrate) resin can be used in combination.

In general, high-crystallinity poly(3-hydroxy butyrate) resins are superior in terms of productivity but have low mechanical strength, while low-crystallinity poly(3-hydroxy butyrate) resins have good mechanical properties although being inferior in terms of productivity. When a high-crystallinity poly(3-hydroxy butyrate) resin and a low-crystallinity poly(3-hydroxy butyrate) resin are used in combination, it is expected that the high-crystallinity poly(3-hydroxy butyrate) resin forms fine resin crystals and the low-crystallinity poly(3-hydroxy butyrate) resin forms tie molecules that crosslink the resin crystals to one another. The combined use of these resins can improve the strength of the stretched film and the film productivity.

The content of 3-hydroxy butyrate units in the high-crystallinity poly(3-hydroxy butyrate) resin is preferably higher than the average content of 3-hydroxy butyrate units in total monomer units constituting the poly(3-hydroxy butyrate) resin mixture.

When the high-crystallinity poly(3-hydroxy butyrate) resin contains hydroxyalkanoate units other than 3-hydroxy butyrate units, the content of the other hydroxyalkanoate units in the high-crystallinity resin is preferably from 1 to 5 mol % and more preferably from 2 to 4 mol %.

The high-crystallinity poly(3-hydroxy butyrate) resin is preferably poly(3-hydroxy butyrate-co-3-hydroxyhexanoate) or poly(3-hydroxy butyrate-co-4-hydroxy butyrate) and more preferably poly(3-hydroxy butyrate-co-3-hydroxy hexanoate).

The content of 3-hydroxy butyrate units in the low-crystallinity poly(3-hydroxy butyrate) resin is preferably lower than the average content of 3-hydroxy butyrate units in total monomer units constituting the poly(3-hydroxy butyrate) resin mixture.

When the low-crystallinity poly(3-hydroxy butyrate) resin contains hydroxyalkanoate units other than 3-hydroxy butyrate units, the content of the other hydroxyalkanoate units in the low-crystallinity resin is preferably from 24 to 99 mol %, more preferably from 24 to 50 mol %, even more preferably from 24 to 35 mol %, and particularly preferably from 24 to 30 mol %.

The low-crystallinity poly(3-hydroxy butyrate) resin is preferably poly(3-hydroxy butyrate-co-3-hydroxy hexanoate) or poly(3-hydroxy butyrate-co-4-hydroxy butyrate) and more preferably poly(3-hydroxy butyrate-co-3-hydroxy-hexanoate).

When the high-crystallinity poly(3-hydroxy butyrate) resin and the low-crystallinity poly(3-hydroxy butyrate) resin are used in combination, the proportion of each resin in the total amount of the two resins is not limited to a particular range. Preferably, the proportion of the high-crystallinity poly(3-hydroxy butyrate) resin is from 10 to 60 wt % and the proportion of the low-crystallinity poly(3-hydroxy butyrate) resin is from 40 to 90 wt %. More preferably, the proportion of the high-crystallinity poly(3-hydroxy butyrate) resin is from 25 to 45 wt % and the proportion of the low-crystallinity poly(3-hydroxy butyrate) resin is from 55 to 75 wt %.

In one embodiment, a middle-crystallinity poly(3-hydroxy butyrate) resin, the crystallinity of which is intermediate between those of the high-crystallinity poly(3-hydroxy butyrate) resin and the low-crystallinity poly(3-hydroxy butyrate) resin, can be further used in combination with the high-crystallinity and low-crystallinity poly(3-hydroxy butyrate) resins.

When the middle-crystallinity poly(3-hydroxy butyrate) resin contains hydroxyalkanoate units other than 3-hydroxy butyrate units, the content of the other hydroxyalkanoate units in the middle-crystallinity resin is preferably from 6 to less than 24 mol %, more preferably from 6 to 22 mol %, even more preferably from 6 to 20 mol %, and still even more preferably from 6 to 18 mol %.

The middle-crystallinity poly(3-hydroxy butyrate) resin is preferably poly(3-hydroxy butyrate-co-3-hydroxyhexanoate) or poly(3-hydroxy butyrate-co-4-hydroxy butyrate) and more preferably poly(3-hydroxy butyrate-co-3-hydroxy-hexanoate).

When the middle-crystallinity poly(3-hydroxy butyrate) resin is further used, the proportion of the middle-crystallinity poly(3-hydroxy butyrate) resin in the total amount of the high-crystallinity, low-crystallinity, and middle-crystallinity poly(3-hydroxy butyrate) resins is preferably from 1 to 99 wt %, more preferably from 5 to 90 wt %, and even more preferably from 8 to 85 wt %.

Obtainment of a blend of two or more poly(3-hydroxy butyrate) resins is not limited to using a particular method. A blend of two or more poly(3-hydroxy butyrate) resins may be obtained by microbial production or chemical synthesis. Alternatively, a blend of two or more resins may be obtained by melting and kneading the resins using a device such as an extruder, a kneader, a Banbury mixer, or a roll mill or may be obtained by dissolving and mixing the resins in a solvent and drying the resulting mixture.

The weight-average molecular weight of the poly(3-hydroxy butyrate) resin as a whole is not limited to a particular range. In terms of ensuring both the strength of the stretched film and the film productivity, the weight-average molecular weight is preferably from $20\times10^4$ to $200\times10^4$, more preferably from $25\times10^4$ to $150\times10^4$, and even more preferably from $30\times10^4$ to $100\times10^4$.

When the poly(3-hydroxy butyrate) resin is a mixture of two or more poly(3-hydroxy butyrate) resins, the weight-average molecular weight of each of the poly(3-hydroxy butyrate) resins constituting the mixture is not limited to a particular range. When the high-crystallinity and low-crystallinity poly(3-hydroxy butyrate) resins as described above are used in combination, the weight-average molecular weight of the high-crystallinity poly(3-hydroxy butyrate) resin is preferably from $20\times10^4$ to $100\times10^4$, more preferably from $22\times10^4$ to $80\times10^4$, and even more preferably from $25\times10^4$ to $60\times10^4$ in terms of ensuring both the strength of the stretched film and the film productivity. The weight-average molecular weight of the low-crystallinity poly(3-hydroxy butyrate) resin is preferably from $20\times10^4$ to $250\times10^4$, more preferably from $25\times10^4$ to $230\times10^4$, and even more preferably from $30\times10^4$ to $200\times10^4$ in terms of ensuring both the strength of the stretched film and the film productivity. When the middle-crystallinity poly(3-hydroxy butyrate) resin as described above is further used, the weight-average molecular weight of the middle-crystallinity poly(3-hydroxy butyrate) resin is preferably from $20\times10^4$ to $250\times10^4$, more preferably from $25\times10^4$ to $230\times10^4$, and even more preferably from $30\times10^4$ to $200\times10^4$ in terms of ensuring both the strength of the stretched film and the film productivity.

The weight-average molecular weight of the poly(3-hydroxybutyrate) resin can be measured as a polystyrene-equivalent molecular weight by gel permeation chromatography (HPLC GPC system manufactured by Shimadzu Corporation) using a chloroform solution of the resin. The column used in the gel permeation chromatography may be any column suitable for weight-average molecular weight measurement.

Production of the poly(3-hydroxy butyrate) resin is not limited to using a particular method and may be accomplished by a production method using chemical synthesis or a microbial production method. A microbial production method is preferred. The microbial production method used can be any known method. Known examples of bacteria that produce copolymers of 3-hydroxy butyrate with other hydroxyalkanoates include *Aeromonas caviae* which is a P3HB3HV- and P3HB3HH-producing bacterium and *Alcaligenes eutrophus* which is a P3HB4HB-producing bacterium. In particular, in order to increase the P3HB3HH productivity, *Alcaligenes eutrophus* AC32 (FERM BP-6038: see T. Fukui, Y. Doi, J. Bacteriol., 179, pp. 4821-4830 (1997)) incorporating a P3HA synthase gene is more preferred. Such a microorganism is cultured under suitable conditions to allow the microorganism to accumulate P3HB3HH in its cells, and the microbial cells accumulating P3HB3HH are used. Instead of the above microorganism, a genetically modified microorganism incorporating any suitable poly(3-hydroxy butyrate) resin synthesis-related gene may be used depending on the poly(3-hydroxy butyrate) resin to be produced. The culture conditions including the type of the substrate may be optimized depending on the poly(3-hydroxy butyrate) resin to be produced.

The poly(3-hydroxy butyrate) resin may be an unmodified resin or may be a resin obtained by modifying an unmodified poly(3-hydroxy butyrate) resin with a resin-reactive material such as a peroxide (such a material will be hereinafter referred to as a "modifying material").

When a modified resin is used as a film raw material, a raw material prepared beforehand by a reaction of a resin and a modifying material may be molded into a film. Alternatively, a resin may be mixed with a modifying material and they may be reacted during molding into a film. When a resin and a modifying material are reacted, all of the resin may be reacted with the modifying material. Alternatively, part of the resin may be reacted with the modifying material to obtain a modified resin, and then the rest of the unmodified resin may be added to the modified resin.

The modifying material is not limited to a particular compound and may be any compound reactive with the poly(3-hydroxybutyrate) resin. In terms of handleability and ease of control of the reaction with the poly(3-hydroxy butyrate) resin, an organic peroxide can be preferably used.

Examples of the organic peroxide include diisobutyl peroxide, cumyl peroxyneodecanoate, di-n-propyl peroxydicarbonate, diisopropyl peroxy dicarbonate, di-sec-butyl peroxy dicarbonate, 1,1,3,3-tetramethylbutyl peroxyneodecanoate, bis(4-t-butylcyclohexyl) peroxy dicarbonate, bis(2-ethylhexyl) peroxy dicarbonate, t-hexyl peroxyneodecanoate, 1-butyl peroxyneodecanoate, 1-butyl peroxyneoheptanoate, t-hexyl peroxypivalate, 1-butyl peroxypivalate, di(3,5,5-trimethylhexanoyl) peroxide, dilauroyl peroxide, 1,1,3,3-tetramethylbutyl peroxy-2-ethylhexanoate, disuccinic acid peroxide, 2,5-dimethyl-2,5-bis(2-ethylhexanoylperoxy) hexane, t-hexyl peroxy-2-ethylhexanoate, di(4-methylbenzoyl) peroxide, dibenzoyl peroxide, 1-butylperoxy-2-ethylhexyl carbonate, t-butylperoxyisopropyl carbonate, 1,6-bis(1-butylperoxycarbonyloxy)hexane, 1-butyl peroxy-3,5,5-trimethylhexanoate, 1-butyl peroxyacetate, t-butyl peroxy benzoate, t-amyl peroxy-3,5,5-trimethylhexanoate, 2,2-bis(4,4-di-t-butylperoxycyclohexyl)propane, and 2,2-di-t-butylperoxy butane. Among these, 1-butylperoxy-2-ethylhexyl carbonate and t-butylperoxyisopropyl carbonate are preferred. Two or more of the above organic peroxides may be used in combination.

The organic peroxide used may be in any form such as a solid or liquid and may be a liquid diluted with a diluent or the like. An organic peroxide easily miscible with the poly(3-hydroxy butyrate) resin (in particular, an organic peroxide that is liquid at room temperature (25 °C)) is preferred because such an organic peroxide can be uniformly dispersed in the poly(3-hydroxy butyrate) resin to prevent a local modification reaction in the resin composition.

(Another Resin)

The film web may contain another resin in addition to the poly(3-hydroxy butyrate) resin to the extent that the other resin does not diminish the effect of the invention. Examples of the other resin include: aliphatic polyester resins such as poly butylene succinate adipate, poly butylene succinate, polycaprolactone, and polylactic acid; and aliphatic-aromatic polyester resins such as polybutylene adipate terephthalate, poly butylene sebacate terephthalate, and poly butylene azelate terephthalate. Only one such other resin may be contained, or two or more such other resins may be contained.

The amount of the other resin is not limited to a particular range, but is preferably 100 parts by weight or less, more preferably 50 parts by weight or less, even more preferably 30 parts by weight or less, still even more preferably 20 parts by weight or less, and particularly preferably 10 parts by weight or less per 100 parts by weight of the poly(3-hydroxy butyrate) resin. The amount of the other resin may be 5 parts by weight or less or may be 1 part by weight or less. The lower limit of the amount of the other resin is not limited to a particular value, and the amount of the other resin may be 0 part by weight or more.

The film web may contain an additive usable with the poly(3-hydroxy butyrate) resin to the extent that the additive does not diminish the effect of the invention. Examples of the additive include: a colorant such as a pigment or dye: an odor absorber such as activated carbon or zeolite: a flavor such as vanillin or dextrin; and other additives such as a filler, a plasticizer, an oxidation inhibitor, an antioxidant, a weathering resistance improver, an ultraviolet absorber, a nucleating agent, a lubricant, a mold release, a water repellent, an antimicrobial, and a slidability improver. Only one additive may be contained, or two or more additives may be contained. The amounts of these additives can be set by those skilled in the art as appropriate depending on the intended purpose.

The following describes the nucleating agent, lubricant, filler, and plasticizer in detail.

(Nucleating Agent)

The film web may contain a nucleating agent. Examples of the nucleating agent include: polyhydric alcohols such as pentaerythritol, galactitol, and mannitol; and other compounds such as orotic acid, aspartame, cyanuric acid, glycine, zinc phenylphosphonate, and boron nitride. Among these, pentaerythritol is preferred because it is particularly superior in the accelerating effect on crystallization of the poly(3-hydroxy butyrate) resin. One nucleating agent may be used, or two or more nucleating agents may be used. The proportions of the nucleating agents used can be adjusted as appropriate depending on the intended purpose.

The amount of the nucleating agent used is not limited to a particular range, but is preferably from 0.1 to 5 parts by weight, more preferably from 0.5 to 3 parts by weight, and even more preferably from 0.7 to 1.5 parts by weight per 100 parts by weight of the total amount of the poly(3-hydroxy butyrate) resin.

(Lubricant)

The film web may contain a lubricant. Examples of the lubricant include behenamide, oleamide, erucamide, stearamide, palmitamide, N-stearyl behenamide, N-stearyl erucamide, ethylenebisstearamide, ethylenebisoleamide, ethylenebiserucamide, ethylenebislauramide, ethylenebiscapramide, p-phenylenebisstearamide, and a polycondensation product of ethylenediamine, stearic acid, and sebacic acid. Among these, behenamide and erucamide are preferred because they are particularly superior in the lubricating effect on the poly(3-hydroxy butyrate) resin. One lubricant may be used, or two or more lubricants may be used. The proportions of the lubricants used can be adjusted as appropriate depending on the intended purpose.

The amount of the lubricant used is not limited to a particular range, but is preferably from 0.01 to 5 parts by weight, more preferably from 0.05 to 3 parts by weight, and even more preferably from 0.1 to 1.5 parts by weight per 100 parts by weight of the total amount of the poly(3-hydroxy butyrate) resin.

(Filler)

The film web may contain a filler. The inclusion of a filler can further enhance the strength of the stretched film. The filler may be an inorganic filler or an organic filler, and inorganic and organic fillers may be used in combination. Examples of inorganic fillers include, but are not limited to, silicate salts, carbonate salts, sulfate salts, phosphate salts, oxides, hydroxides, nitrides, and carbon black. One inorganic filler may be used alone, or two or more inorganic fillers may be used in combination.

The amount of the filler is not limited to a particular range, but is preferably from 1 to 100 parts by weight, more preferably from 3 to 80 parts by weight, even more preferably from 5 to 70 parts by weight, and still even more preferably from 10 to 60 parts by weight per 100 parts by weight of the poly(3-hydroxybutyrate) resin. The film web need not contain any filler.

(Plasticizer)

The film web may contain a plasticizer. Examples of the plasticizer include glycerin ester compounds, citric ester compounds, sebacic ester compounds, adipic ester compounds, polyether ester compounds, benzoic ester compounds, phthalic ester compounds, isosorbide ester compounds, polycaprolactone compounds, and dibasic ester compounds. Among these, glycerin ester compounds, citric ester compounds, sebacic ester compounds, and dibasic ester compounds are preferred because they are particularly superior in the plasticizing effect on the poly(3-hydroxy butyrate) resin. Examples of the glycerin ester compounds include glycerin diacetomonolaurate. Examples of the citric ester compounds include tributyl acetylcitrate. Examples of the sebacic ester compounds include dibutyl sebacate. Examples of the dibasic ester compounds include benzyl methyl diethylene glycol adipate. One plasticizer may be used, or two or more plasticizers may be used. The proportions of the plasticizers used can be adjusted as appropriate depending on the intended purpose.

The amount of the plasticizer used is not limited to a particular range, but is preferably from 1 to 20 parts by weight, more preferably from 2 to 15 parts by weight, and even more preferably from 3 to 10 parts by weight per 100 parts by weight of the total amount of the poly(3-hydroxy butyrate) resin. The film web need not contain any plasticizer.

<Production of Film Web>

Production of the film web is not limited to using a particular method and can be accomplished using any suitable known method. Specific examples of the method include blown film molding. T-die extrusion molding using an extruder equipped with a T-die, calendering, and rolling. Among these, blown film molding or T-die extrusion molding is preferred since, with either of these molding methods, a strip-shaped film can be produced at high productivity.

(Blown Film Molding)

The "blown film molding" refers to a molding method in which an extruder fitted at its end with a cylindrical die is used to extrude a molten resin into the shape of a tube, immediately a gas is injected into the tube to inflate the tube into the shape of a balloon, and the balloon is molded into a film. The blown film molding is not limited to using particular means and can be carried out, for example, by means of a common blown film molding machine for use in molding a thermoplastic resin into a film.

The "common blown film molding machine" refers to a molding machine including a single-screw extruder fitted with a cylindrical die. The single-screw extruder may be any single-screw extruder that melts and kneads an introduced raw material resin and that discharges the kneaded product at a constant rate while maintaining the kneaded product at a desired temperature. The single-screw extruder is not limited to having a particular screw design. A screw including a mixing element is preferred in terms of kneading performance. The cylindrical die is not limited to having a particular structure. A spiral mandrel die is preferred because the use of this die reduces the occurrence of welds and makes it easy to achieve uniformity in thickness.

The molding temperature in the blown film molding is not limited to a particular range and may be any temperature at which the resin can be properly melted. For example, the molding temperature is preferably from 135 to 200 °C. The "molding temperature" refers to a resin temperature during the period from resin introduction into the extruder to resin discharge from the die. The resin temperature can be typically measured, for example, by a thermometer mounted on an adapter.

The haul-off speed in the blown film molding depends on the thickness and width of the film and the resin discharge rate and can be adjusted within a range over which the bubble stability can be ensured. In general, the haul-off speed is preferably from 1 to 100 m/min.

In the blown film molding, an air ring that blows air onto the exterior of the bubble can be used to solidify the discharged molten resin and stabilize the bubble. A suitable air blowing structure of the air ring is a slit-type structure including: a plurality of annular slits through which air is blown out; and chambers which are located between the slits to facilitate the stabilization of the bubble.

The blow-up ratio (hereinafter abbreviated as "BUR") in the blown film molding is the bubble's cross-sectional circumference divided by the die diameter. In terms of enhancing the film strength, the BUR is preferably at least 1.5, more preferably at least 1.7, even more preferably at least 1.9, and particularly preferably at least 2. In terms of molding stability, the BUR is preferably up to 5.5, more preferably up to 4.5, even more preferably up to 4.0, and particularly preferably up to 3.5.

(T-Die Extrusion Molding)

The "T-die extrusion molding" refers to a molding method in which a molten resin is extruded as a sheet by an extruder from a slit-shaped discharge outlet onto a cast roll to form a film. The T-die used is not limited to a particular type and can be any suitable known T-die. For example, the T-die preferably has a discharge outlet so shaped as to extrude a sheet-shaped thermoplastic resin although the T-die is not limited to having a particular shape. The discharge outlet is not limited to having a particular shape either.

In the extrusion step, a sheet-shaped thermoplastic resin is extruded from the discharge outlet of the T-die. The thermoplastic resin may have any kind of sheet shape and is not limited to having a particular thickness or width. The thickness of the sheet-shaped thermoplastic resin is preferably from 20 to 600 μm to reduce the unevenness in thickness and make post-extrusion cooling easy.

In the extrusion step, the melt viscosity of the thermoplastic resin to be extruded from the discharge outlet of the T-die is not limited to a particular range. The melt viscosity is preferably 1500 Pa·sec or less to reduce the unevenness in thickness and prevent the occurrence of die lines. The melt viscosity can be measured according to any suitable known method.

<Crystallinity of Film Web>

The film web used is preferably a film having high crystallinity because such a film does not readily stick to a device that the film contacts during a preheating or stretching step described later or during film transfer. To be specific, the crystallinity of the film web is preferably higher than 40%, more preferably higher than 45%, even more preferably 48% or more, and particularly preferably 50% or more.

The upper limit of the crystallinity of the film web is not limited to a particular value. In terms of preventing film break during the stretching step and achieving a high stretch ratio, the crystallinity of the film web is preferably 80% or less and more preferably 70% or less.

The crystallinity of the film web depends primarily on the resin temperature during molding into the film web and the cooling temperature after the molding (e.g., the temperature of the air ring and the temperature of the cast roll). The crystallinity of the film web is also influenced by the cooling time, the ambient temperature during the cooling, the proportions of the monomer units in the poly(3-hydroxy butyrate) resin, and the presence or amount of additives such as a nucleating agent. By taking into account these parameters, the crystallinity of the film web can easily be controlled.

The crystallinity of the film web can be determined by reference to POLYMER, 1992, Volume 33, Number 7, pp. 1563-1567. For example, the crystallinity can be determined by the following procedures.

The film prepared as a measurement object is immediately cut into 2 cm×2 cm square pieces. The square pieces are stacked to a thickness of 200 to 500 μm and the stack is fixed on a glass holder.

This glass holder is secured to a sample clip located beside a characteristic X-ray Cu-Kα light source in an XRD device, by which XRD measurement is performed at a scan speed of 0.02 to 0.5°/min over the range of 5 to 40°. The XRD device used can be Rint 2500 manufactured by Rigaku Corporation.

The XRD pattern obtained by this measurement is zero-point-corrected at both ends, and the area (integrated intensity) of the zero-point-corrected pattern is defined as Ia+Ic (area of halo attributed to amorphous portion+ area of peak attributed to crystalline portion). The halo attributed to the amorphous portion is eliminated from the zero-point-corrected pattern (in such a way as to maintain the symmetry of scattering peak intensity), and the area of the resulting pattern is defined as Ic. The crystallinity is calculated by the formula Ia/(Ia+Ic)×100.

During the period from the preparation of the sample to the start of the measurement, the sample is stored by freezing at or below 0 °C to inhibit further crystallization.

<Thickness of Film Web>

The thickness of the film web is not limited to a particular range and may be set as appropriate in view of parameters such as the desired thickness, stretch ratio, and strength of the stretched film. For example, the thickness of the film web is preferably from 20 to 1,000 μm, more preferably from 30 to 750 μm, and even more preferably from 40 to 500 μm.

<Stretching Step>

In the stretching step, the film is stretched while controlling the temperature of the film within a given range.

The stretching step is not limited to stretching in a particular direction, and the film can be stretched in any direction in the plane of the film. When the film web is a strip-shaped film, the stretch direction may be the MD or TD direction of the film and is preferably the MD direction. The MD direction is also called a machine direction, flow direction, or length direction. The TD direction is a direction perpendicular to the MD direction and also called a transverse direction or width direction.

The stretching is not limited to using a particular technique. A preferred technique is to stretch the film by elongating the film in the stretch direction. The phrase "elongating the film in the stretch direction" means pulling the film in the stretch direction. With the use of a stretching method involving pressure application in the film thickness direction, such as rolling in which the film is pressed between two rolls, the film web is likely to stick to the rolls, and the sticking could reduce the stretched film productivity.

The elongation of the film in the stretch direction is not limited to using a particular technique. When the stretching is performed in a batch manner, the film may be held at its ends and pulled in the stretch direction.

When the film is stretched in the MD direction along with continuous transfer of the film, for example, the stretching in the MD direction can be accomplished by using a roll longitudinal stretching machine including a plurality of rolls on which the film is transferred and by operating the plurality of rolls at different rotational speeds. The stretch ratio in the MD direction can be determined by the ratio between the roll rotational speed before stretching and the roll rotational speed after stretching.

When the film is stretched in the TD direction along with continuous transfer of the film, for example, the stretching in the TD direction can be accomplished by using a transverse stretching machine such as a clip tenter to clamp the film at both width ends and pull the clamped film in the TD direction. The stretch ratio in the TD direction can be determined by the ratio between the width of the clamped film before stretching and the width of the clamped film after stretching.

In the stretched film production method according to the present embodiment, the stretching step is performed along with control of the film temperature. Specifically, the film web is stretched under conditions where a film surface maximum temperature is in a temperature range represented by the following inequality (1):

$$Tm-60 \leq \text{film surface maximum temperature (°C)} \leq Tm-5. \quad (1)$$

The Tm is the melting point (° C.) of the film web. The melting point of the film web refers to the temperature at which the top of a melting point peak is located in a DSC curve obtained by differential scanning calorimetry. The details of the differential scanning calorimetry will be described later in Examples.

The film surface maximum temperature refers to a maximum temperature that the film web reaches when, in the stretching step, the film web is being subjected to a force acting to elongate the film web in the stretch direction.

It is inferred that controlling the film surface maximum temperature during stretching within the above temperature range close to the melting point of the film web can lead to melting of part of resin crystals contained in the film web. Thus, the stretching can be accomplished at high productivity regardless of the crystallinity of the film web. That is, according to the present embodiment, the stretching can be accomplished at high productivity even when the film web used is one that has high crystallinity and is usually difficult to stretch.

If the film surface maximum temperature is lower than Tm-60 (C) during the stretching, the film web, which has high crystallinity and is extremely hard, breaks due to a force acting on the film web in the stretching step or undergoes uneven stretching which makes it difficult to obtain a uniform stretched film. In terms of preventing uneven stretching, the film surface maximum temperature is preferably at least Tm-50 (° C.), more preferably at least Tm-40 (° C.), even more preferably at least Tm-30 (° C.), still even more preferably at least Tm-20 (° C.), and particularly preferably at least Tm-15 (° C.). Increasing the film surface maximum temperature within the above temperature range makes it more likely to achieve a high stretch ratio while preventing uneven stretching.

Conversely, if the film surface maximum temperature is higher than Tm-5 (° C.) during the stretching, the film being stretched suffers melting down which makes it difficult to obtain a stretched film. In terms of avoiding melting down of the film, the film surface maximum temperature is preferably up to Tm-7 (° C.), more preferably up to Tm-8 (° C.), and even more preferably up to Tm-9 (° C.).

To control the film temperature in the stretching step, the film is preferably heated during the stretching so that the film surface maximum temperature falls within the temperature range described above.

The film heating is not limited to using a particular technique. Examples of film heating techniques include: a technique in which hot air heated to a temperature within the temperature range described above is applied to the film being stretched: a technique in which the film being stretched is heated using auxiliary heating means such as an infrared heater: a technique in which the film is stretched in a heating furnace adjusted to a given temperature; and a technique which is used when the film is stretched by means of a pair of stretching rolls along with continuous transfer of the film and in which one of the two rolls that is upstream in the flow direction of the film is heated to a temperature within the temperature range described above. One of these techniques may be used alone, or two or more thereof may be combined.

The film heating technique used may be a technique in which a roll heated to a temperature within the temperature range described above is brought into contact with the film web since, with this technique, the heating can be accomplished in a simple way. However, the film heating technique used is preferably a non-contact heating technique in which any heating tool heated to a temperature within the temperature range described above does not contact the film web. With this technique, the problem of film sticking to the heating tool can be avoided, and the stretched film productivity can be further enhanced.

One preferred aspect of the non-contact heating technique is a technique in which hot air is applied to the film being stretched. In this technique, the temperature of the hot air applied to the film is set to fall within the temperature range described above.

When the film is stretched by means of a pair of stretching rolls along with continuous transfer of the film, the hot air is preferably applied to the film between the upstream and downstream stretching rolls in the flow direction of the film. During the application of the hot air, the temperatures of the stretching rolls are preferably below the temperature range described above. According to this aspect, film sticking to the stretching rolls can be avoided.

Among heating methods using hot air, a floating-type heating method is particularly preferred in terms of heating efficiency. The floating-type heating is a method in which the film is heated by blowing hot air from upper and lower nozzles onto both sides of the film. A plurality of alternating upper and lower nozzles are directed towards the surface of the film, and the film can be heated by hot air blown from each of the upper and lower nozzles without contact of the film with any of the upper and lower nozzles.

Another preferred aspect of the non-contact heating technique is infrared radiation heating in which infrared radiation is applied to the film being stretched. This heating method is preferred because, with this method, the surface and interior of the film can be heated to the same temperature within a short time to allow the entire film to be stretched evenly.

The infrared radiation applied to the film can be an electromagnetic wave in a usual infrared region and may be any of near-infrared radiation (wavelength=0.74 to 1.5 μm), mid-infrared radiation (wavelength=1.5 to 3.0 μm), and far-infrared radiation (wavelength=3.0) μm to 1 mm).

When the film is stretched by means of a pair of stretching rolls along with continuous transfer of the film, the infrared radiation is preferably applied to the film between the upstream and downstream stretching rolls in the flow direction of the film. During the application of the infrared radiation, the temperatures of the stretching rolls are preferably below the temperature range described above. According to this aspect, film sticking to the stretching rolls can be avoided.

The stretch ratio achieved in the stretching step described above is not limited to a particular range but is preferably 1.1 or more. The stretch ratio is more preferably 1.5 or more and even more preferably 2 or more. According to the present embodiment, a high stretch ratio can be achieved at high productivity. The upper limit of the stretch ratio is not limited to a particular value and may be chosen as appropriate. For example, the stretch ratio may be 8 or less or may be 7 or less.

<Optional Preheating Step>

In the production method according to the present embodiment, a preheating step of heating the film web to a temperature lower than the film surface maximum temperature reached in the stretching step is preferably performed before the heating in the stretching step. By performing such a preheating step beforehand, the film temperature control in the stretching step can be performed more efficiently, and the stretched film productivity can be further enhanced.

A film surface maximum temperature reached in the preheating step is preferably lower than the temperature expressed as Tm-60 (C) above and more preferably equal to or lower than Tm-65 (° C.). The lower limit of the maximum temperature is no limited to a particular value. The maximum temperature is preferably 50 °C or higher, more preferably 60 °C or higher, and particularly preferably 70 °C or higher.

The film heating in the preheating step is not limited to using a particular technique. Any of the heating techniques described above for the stretching step can be used as appropriate. Besides the described techniques, a technique can also be used in which the film is heated by bringing a roll other than stretching rolls into contact with the film. One of these techniques may be used alone, or two or more thereof may be combined.

In the preheating step, the heating temperature is low; and thus rolls do not readily stick to the film. For this reason, a technique can be preferably used in which the film is heated by bringing a roll into contact with the film.

When the film is stretched along with continuous transfer of the film, it is preferable to preheat the film by using an upstream stretching roll located upstream in the flow direction of the film and/or at least one preheating roll located upstream of the upstream stretching roll in the flow direction of the film. In particular, it is preferable to preheat the film by using a plurality of rolls. In this preheating, the temperatures of the plurality of rolls are particularly preferably set such that the roll temperature increases stepwise in the flow direction of the film.

<Optional Thermal Treatment Step>

Preferably, the film having undergone the stretching step is subjected to a thermal treatment step to cool the film to a temperature lower than the film temperature during the stretching step. This thermal treatment step can lead to enhancement of the strength of the stretched film and stabilization of the physical properties of the stretched film.

The cooling temperature in the optional thermal treatment step is preferably, for example, from 30 to 150 °C, more preferably from 40 to 140 °C, even more preferably from 40 to 120 °C, and particularly preferably from 50 to 110 °C.

The film temperature control in the optional thermal treatment step is not limited to using a particular technique. Any of the heating techniques described above for the stretching step and the preheating step may be used as appropriate. One of the techniques described above may be used alone, or two or more thereof may be combined.

When the film is stretched along with continuous transfer of the film, it is preferable to perform the thermal treatment step by using a downstream stretching roll located downstream in the flow direction of the film and/or at least one thermal treatment roll located downstream of the downstream stretching roll in the flow direction of the film.

The optional thermal treatment step is preferably performed with tension applied to the film in the direction in which the film has been stretched. This makes it possible to avoid heat shrinkage of the film. When the tension is applied in the MD direction, the tension application may be done, for example, by controlling the respective rotational speeds of a plurality of rolls on which the film is transferred. When the tension is applied in the TD direction, the tension application may be done, for example, by performing the thermal treatment step while clamping the film at both width ends and pulling the clamped film in the TD direction by means of a transverse stretching machine.

It should be noted that the thermal treatment step does not include substantial stretching of the film. The phrase "not include substantial stretching of the film" means that any operation intended to stretch the film is not performed in the thermal treatment step.

<Continuous Production Method According to Preferred Aspect>

The stretched film production method according to the present embodiment may be performed in a batch manner. However, in terms of the stretched film productivity, the production method is preferably performed in a continuous manner.

In the case where the production method is performed in a continuous manner, the steps are preferably performed along with continuous transfer of the film. Specifically, it is preferable to continuously feed one film end from the film web wound in a roll and sequentially perform the optional preheating step, the stretching step, and the optional thermal treatment step. The stretched film produced through these steps is preferably wound on a take-up roll continuously.

When the film is continuously transferred, the transfer speed is not limited to a particular range. In terms of the film productivity; the transfer speed is preferably 5 m/min or more before the start of stretching. In terms of the production stability, the transfer speed is preferably 50 m/min or less before the start of stretching.

FIG. 1 shows an example of a production line for performing film stretching continuously along with transfer of the film. The arrows in the figure represent the flow direction of the film.

A strip-shaped film web 21 is produced from a raw material containing a poly(3-hydroxy butyrate) resin etc. by blown film molding or T-die extrusion molding and wound on a feed roll 11. One end of the film web 21 is fed from the feed roll 11, and the film web 21 is transferred through a given path by a plurality of transfer rolls. Along with this transfer, the film web 21 is processed into a stretched film 22 through given processes including stretching, and the stretched film 22 is wound on a take-up roll 12.

The plurality of transfer rolls include, in order from the feed roll 11 in the flow direction, three preheating rolls 31, 32, and 33, a pair of stretching rolls 34 and 35, and two thermal treatment rolls 36 and 37. It should be noted that the number of the preheating rolls is not limited to three and the number of the thermal treatment rolls is not limited to two.

The roll surface temperatures of the preheating rolls 31, 32, and 33 and the upstream stretching roll 34 are set such that the roll surface temperature increases stepwise in the flow direction: specifically, the roll surface temperatures of the preheating rolls 31, 32, and 33 and the upstream stretching roll 34 are set to 60 °C, 80 °C, 100 °C, and 110 °C, respectively. A preheating step is performed in which the film web is heated stepwise by contact with these rolls. The set temperatures of these rolls are relatively low; and thus sticking of the film to each roll is reduced.

The film stretching is performed between the pair of stretching rolls 34 and 35. The rotational speed of the downstream stretching roll 35 is controlled to be higher than the rotational speed of the upstream stretching roll 34, and this difference in rotational speed leads to the film web being stretched in the MD direction.

There is a heating zone A between the pair of stretching rolls 34 and 35. In the heating zone, a plurality of upper nozzles A1 are placed facing the upper side of the film, and a plurality of lower nozzles A2 are placed facing the lower side of the film. The upper nozzles A1 are arranged in the flow direction of the film, and the same is true of the lower nozzles A2. Hot air is blown from each of the nozzles towards the film being transferred, and thus the film is heated while being stretched.

The temperature of the hot air is controlled to a temperature within the range of Tm-60) (° C.) to Tm-5 (° C.). For example, when the Tm is 146 °C, the temperature of the hot air may be 137 °C. This control of the hot air temperature makes it possible to control the film surface maximum temperature during stretching within the range of Tm-60 (° C.) to Tm-5 (° C.). As a result, the stretching of the poly(3-hydroxy butyrate) resin-containing film web can be accomplished at high productivity.

Alternatively, it is preferable to heat the film by using an infrared heater instead of the upper and lower nozzles A1 and A2.

The roll surface temperatures of the downstream stretching roll 35 and the thermal treatment rolls 36 and 37 are set to 50 °C. A thermal treatment step is performed in which the film is cooled by contact with these rolls. The set temperatures of these rolls are low; and thus sticking of the film to each roll is reduced.

The film having undergone the preheating step, the stretching step, and the thermal treatment step as described above is wound as the stretched film 22 on the take-up roll 12. In this way, a stretched film can be continuously produced.

<Method for Producing Biaxially-Stretched Film>

A stretched film production method according to another aspect of the present invention may be a method for producing a biaxially-stretched film. In this aspect, the stretching step includes the steps of: (i) stretching the film web in a given direction; and (ii) stretching the film web in a direction perpendicular to the given direction while controlling the film temperature within a given range. The steps (i) and (ii) may be performed sequentially (sequential biaxial stretching) or may be performed simultaneously (simultaneous biaxial stretching).

The step (i) is not limited to stretching in a particular direction, and the film can be stretched in any direction in the plane of the film. When the film web is a strip-shaped film, the stretch direction may be the MD or TD direction of the film and is preferably the MD direction.

The step (ii) is not limited to stretching in a particular direction, and the stretch direction in the step (ii) may be any direction perpendicular to the stretch direction in the step (i). When the film web is a strip-shaped film, the stretch direction may be the MD or TD direction of the film and is preferably the TD direction.

The steps (i) and (ii) are not limited to using particular stretching techniques, and the techniques previously described can be used as appropriate.

In the biaxially-stretched film production method according to the present aspect, the step (ii) is performed along with control of the film temperature. Specifically, the stretching is performed under conditions where a film surface maximum temperature is within a temperature range represented by the inequality shown above.

In this aspect, the film surface maximum temperature in the inequality refers to a maximum temperature that the film reaches when, in the step (ii), the film is being subjected to a force acting to elongate the film in the stretch direction. The preferred range of the film surface maximum temperature in the step (ii) is as mentioned above and will therefore not be described below:

The film heating technique used may also be as previously described. It is preferable to use a non-contact heating technique. In particular, a technique is preferred in which hot air or infrared radiation is applied to the film being stretched. When the film is clamped at both width ends and stretched in the TD direction along with continuous transfer of the film, hot air or infrared radiation is preferably applied to the region of the film that extends in the flow direction of the film and that is clamped at both width ends.

The stretch ratio achieved in the step (ii) is not limited to a particular range and may be as previously described.

The stretching in the step (i) is not limited to using particular temperature conditions, but is preferably performed along with control of the film temperature. Specifically, the film web is stretched in a given direction under conditions where the film surface maximum temperature is within a temperature range represented by the following inequality (1):

$$Tm-60 \leq \text{film surface maximum temperature (°C)} \leq Tm-5. \qquad (1)$$

The Tm is the melting point (° C.) of the film web.

The details of the temperature conditions and heating method preferred in the step (i) are the same as the details of the temperature conditions and heating method previously described and will therefore not be described below: The film surface maximum temperature in the inequality (1) refers to the maximum temperature that the film reaches when, in the step (i), the film is being subjected to a force acting to elongate the film in the stretch direction.

The stretch ratio achieved in the step (i) is not limited to a particular range but is preferably 1.1 or more. The stretch ratio is more preferably 1.5 or more and even more preferably 2 or more. According to the present embodiment, a high stretch ratio can be achieved at high productivity. The upper limit of the stretch ratio is not limited to a particular value and may be chosen as appropriate. For example, the stretch ratio may be 8 or less or may be 7 or less.

In the biaxially-stretched film production method according to the present aspect, a preheating step of heating the film web to a temperature lower than the film surface maximum temperature reached in the step (i) and/or the step (ii) is preferably performed before the heating in the step (i) and/or the step (ii) (in particular, before the heating in the step (i)). By performing such a preheating step beforehand, the film temperature control in the step (i) and/or the step (ii) can be performed more efficiently, and the biaxially-stretched film productivity can be further enhanced. The conditions in the preheating step are as previously described.

In the biaxially-stretched film production method according to the present aspect, the biaxially-stretched film having undergone the stretching step is preferably subjected to a thermal treatment step to cool the film to a temperature lower than the film temperature during the stretching step. This thermal treatment step can lead to enhancement of the strength of the biaxially-stretched film and stabilization of the physical properties of the biaxially-stretched film. The conditions in the thermal treatment step are also as previously described above.

The biaxially-stretched film production method according to the present aspect may be performed in a batch manner. As described above, however, in terms of the biaxially-stretched film productivity, the production method is preferably performed in a continuous manner.

<Stretched Film>

A stretched film that can be produced according to the present embodiment (the stretched film may be a biaxially-stretched film, and the same applies hereinafter) preferably has high crystallinity in order to have high strength and stable film physical properties. Specifically, the crystallinity of the stretched film is preferably higher than 40%, more preferably 50% or more, even more preferably 55% or more, and particularly preferably 60% or more. The upper limit of the crystallinity of the stretched film is not limited to a particular value. The crystallinity of the stretched film is 100% or less and may be 90% or less or may be 80% or less.

The crystallinity of the stretched film depends primarily on the crystallinity of the film web and other parameters such as the heating temperature during the stretching and the cooling temperature in the optional thermal treatment step. The crystallinity of the stretched film is also influenced by the time spent in each step and the thickness of the film. By taking into account these parameters, the crystallinity of the stretched film can easily be controlled.

The crystallinity of the stretched film can be measured by the method as described above for the crystallinity of the film web.

The thickness of the stretched film that can be produced according to the present embodiment is not limited to a particular range and can be set as appropriate by those skilled in the art. In terms of uniformity in thickness, visual appearance, strength, and low weight of the film, the thickness of the film is preferably from 10 to 200 μm, more preferably from 15 to 150 μm, and even more preferably from 20 to 100 μm. The thickness of the biaxially-stretched film is preferably from 5 to 200 μm, more preferably from 8 to 150 μm, and even more preferably from 10 to 100 μm.

Another layer may be formed on the stretched film. Examples of the other layer include a resin layer, an inorganic material layer, a metal layer, a metal oxide layer, and a printed layer. The other layer may be a lamination layer, a coating layer, or a vapor-deposited layer.

The stretched film has high strength even when it is thin. Thus, the stretched film is suitable for use as a packaging film, a heat-sealable film, a twist film, or the like.

In the following items, preferred aspects of the present disclosure are listed. The present invention is not limited to the following items.

[Item 1]

A method for producing a stretched film by stretching a film web containing a poly(3-hydroxy butyrate) resin, the method including the step of:

stretching the film web under conditions where a film surface maximum temperature is within a temperature range represented by the following inequality (1):

$$Tm - 30 \leq \text{film surface maximum temperature (°C)} \leq Tm - 5. \quad (2)$$

the Tm is a melting point (° C.) of the film web.

[Item 2]

The method according to item 1, wherein the temperature range represented by the inequality (1) is a temperature range represented by the following inequality (2):

$$Tm - 60 \leq \text{film surface maximum temperature (°C)} \leq Tm - 5, \quad (1)$$

[Item 3]

The method according to item 1 or 2, wherein the film web has a crystallinity of more than 40%.

[Item 4]

The method according to any one of items 1 to 3, wherein the stretched film has a crystallinity of more than 40%.

[Item 5]

The method according to any one of items 1 to 4, wherein the stretched film has a crystallinity of 50% or more.

[Item 6]

The method according to any one of items 1 to 5, wherein during the stretching, the film web is heated to control the film surface maximum temperature within the temperature range.

[Item 7]

The method according to item 6, wherein the heating is performed using at least one non-contact heating technique selected from hot air heating and infrared radiation heating.

[Item 8]

The method according to item 7, wherein the hot air heating is floating-type heating.

[Item 9]

The method according to item 7 or 8, further including the step of preheating the film web to a temperature lower than the film surface maximum temperature before performing the non-contact heating technique.

[Item 10]

The method according to any one of items 6 to 10, wherein the heating is performed by heating a roll to a temperature within the temperature range and bringing the heated roll into contact with the film web.

[Item 11]

The method according to any one of items 1 to 10, wherein the stretching is performed by using a plurality of rolls on which the film web is transferred and by operating the plurality of rolls at different rotational speeds.

[Item 12] The method according to any one of items 1 to 11, wherein a stretch ratio achieved by the stretching is from 1.1 to 8.

[Item 13]

The method according to any one of items 1 to 12, wherein the film web is a film produced by blown film molding.

[Item 14]

The method according to item 13, wherein a blow-up ratio in the blown film molding is 2 or more.

[Item 15]

The method according to any one of items 1 to 12, wherein the film web is a film produced by T-die extrusion molding.

[Item 16]

The method according to any one of items 1 to 15, wherein the poly(3-hydroxy butyrate) resin includes poly(3-hydroxybutyrate-co-3-hydroxyhexanoate).

[Item 17]

The method according to any one of items 1 to 16, wherein the stretched film is a biaxially-stretched film, the method includes the steps of (i) stretching the film web in a given direction, and (ii) stretching the film web in a direction perpendicular to the given direction, and in the step (ii), the stretching is performed under conditions where the film surface maximum temperature is within the temperature range represented by the inequality (1).

[Item 18]

The method according to item 17, wherein the step (i) is performed under conditions where a film surface maximum temperature is within a temperature range represented by the following inequality (1):

$$Tm - 60 \leq \text{film surface maximum temperature (°C)} \leq Tm - 5, \quad (1)$$

the Tm is a melting point (° C.) of the film web.

[Item 19]

The method according to item 17 or 18, wherein the step (i) and the step (ii) are performed sequentially.

[Item 20]

The method according to item 17 or 18, wherein the step (i) and the step (ii) are performed simultaneously.

EXAMPLES

Hereinafter, the present invention will be described more specifically using Examples and Comparative Examples. The present invention is not limited by Examples in any respect.

The following raw material was used in Examples and Comparative Examples.

(Poly(3-Hydroxy butyrate) Resin)

$$A\text{-}1\text{:Poly}(3\text{-hydroxybutylrate-}co\text{-}3\text{-hydroxyhexanoate})$$
$$(\text{average contenet ratio } 3HB/3HH = 94/6 \ (\text{mol \%/mol \%}),$$
$$\text{weight-average molecular weight} = 60 \times 10^4 \text{ g/mol},$$
$$\text{glass transition temperature} = 6 \text{ °C})$$

This resin was produced according to a method described in Example 1 of WO 2019/142845.

(Evaluation of Film Thickness)

The thickness of the film was measured using a caliper at 10 points spaced at intervals of 10 cm in the TD direction. An arithmetic mean of the 10 thickness values was calculated as the film thickness.

(Method for Measuring Melting Point)

The melting point of the resin was determined by differential scanning calorimetry according to JIS K-7121.

Specifically, first, about 4 to 5 mg of the resin as a measurement object was weighed out and subjected to differential scanning calorimetry which used a differential scanning calorimeter (SSC 5200 manufactured by Seiko Instruments & Electronics Ltd.) and in which the resin was heated from 0 to 180 °C at a temperature increase rate of 10 °C/min, and thus a DSC curve was obtained. In the obtained DSC curve, the temperature at which the top of a melting point peak was located was determined as the melting point.

(Method for Measuring Crystallinity)

Both the film web and the stretched film were measured for their crystallinity.

The film prepared as a measurement object was immediately cut into 2 cm×2 cm square pieces. The square pieces were stacked to a thickness of 200 to 500 μm and the stack was fixed on a glass holder.

This glass holder was secured to a sample clip located beside a characteristic X-ray Cu-Kα light source in an XRD device (Rint 2500 manufactured by Rigaku Corporation), by which XRD measurement was performed at a scan speed of 0.02 to 0.5°/min over the range of 5 to 40°.

The XRD pattern obtained by this measurement was zero-point-corrected at both ends, and the area (integrated intensity) of the zero-point-corrected pattern was defined as Ia+Ic (area of halo attributed to amorphous portion+area of peak attributed to crystalline portion). The halo attributed to the amorphous portion was eliminated from the zero-point-corrected pattern (in such a way as to maintain the symmetry of scattering peak intensity), and the area of the resulting pattern was defined as Ic. The crystallinity was calculated by the formula Ia/(Ia+Ic)×100.

(Method for Measuring Tensile Strength at Break)

Figure 2:
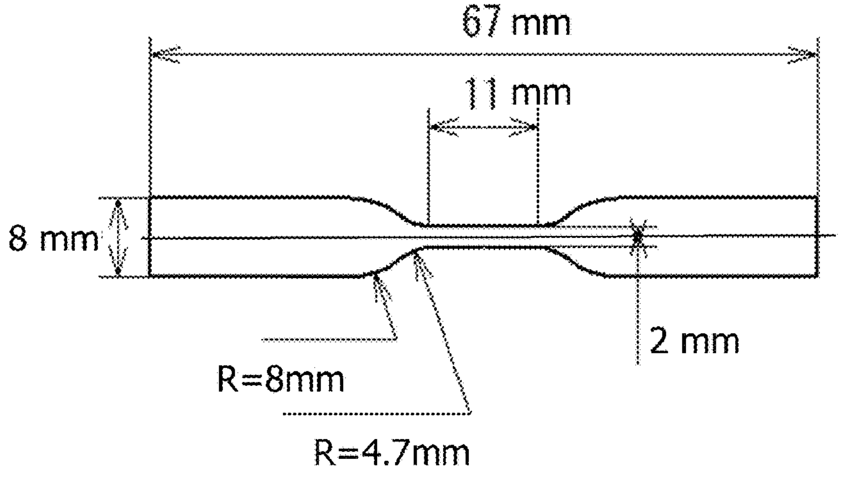
FIG. 2 is a top view showing the shape of a test specimen used to measure the tensile strength at break of a stretched film in an example.

The tensile strength at break of the stretched film was measured as follows: the stretched film was cut to prepare a test specimen shaped as shown in FIG. 2 (test specimen as specified in the former JIS K 7113-2 (1/3)), a tensile test of the test specimen according to JIS K 7127 was performed using a tensile tester (EZ-LX 1 kN manufactured by Shimadzu Corporation) at a tensile speed of 100 mm/min in the stretch direction of the stretched film, and the stress at which the test specimen broke (tensile strength at break) was determined.

[Production of Poly(3-Hydroxy butyrate) Resin Pellets P-1]

One hundred parts by weight of poly(3-hydroxy butyrate) resin A-1 was dry-blended with 0.5 parts by weight of behenamide as a lubricant (BNT-22H manufactured by Nippon Fine Chemical Co., Ltd.), 0.5 parts by weight of erucamide as a lubricant, and 1.0 parts by weight of pentaerythritol as a nucleating agent. The resulting dry blend was placed into a 26-mm-diameter corotating twin-screw extruder whose cylinder temperature and die temperature were set to 150 °C, and the blend was extruded as a strand, which was solidified by passing it through a water bath filled with 45 °C hot water. The solidified strand was cut by a pelletizer to obtain resin pellets P-1. The melting point of the resin pellets P-1 was 146 °C.

Example 1

A blown film molding machine including a 50-mm-diameter single-screw extruder and a blown film molding die (die diameter=100 mm, lip clearance=1.0 mm) was used. The resin pellets P-1 were placed into the extruder and processed at a discharge rate of 29 kg/h, a resin temperature of 165 °C, a lay-flat film width of 390 mm (blow-up ratio=2.5), and a haul-off speed of 5 m/min. As a result, a film web having a thickness of 70 μm and a crystallinity of 58% was obtained.

The obtained film web was cut to prepare a test specimen having a size of 100 mm×200 mm (with its short sides extending in the MD direction). The test specimen with its long sides held was placed into a hot air oven, in which the test specimen was uniaxially stretched in the MD direction at a speed of 400 mm/min and a stretch ratio of 2 while the film temperature was maintained at 135 °C (the short sides of the test specimen were not fixed during the stretching). After that, the resulting film was thermally treated at 50 °C to obtain a stretched film having a thickness of 27 μm and a crystallinity of 61%. The tensile strength at break of the stretched film is shown in Table 1.

Example 2

A 40-mm-diameter single-screw extruder was used to which a 350-mm-wide T-die was coupled. The cylinder temperature and the die temperature of the single-screw extruder were set to 165 °C. The resin pellets P-1 were placed into and melted in the single-screw extruder, and the molten resin with a temperature of 165 °C was extruded as a film through the T-die. The film of the molten resin was extruded onto a cast roll set to 60 °C and molded at a haul-off speed of 10 m/min. After being cooled to a film temperature of 60 °C, the film was separated from the cast roll. Thus, a film web having a thickness of 70 µm and a crystallinity of 58% was obtained.

The obtained film web was stretched in the same manner as in Example 1, except that the stretch ratio was changed to 3. As a result, a stretched film having a thickness of 27 µm and a crystallinity of 62% was obtained. The tensile strength at break of the stretched film is shown in Table 1.

Example 3

The film web obtained in Example 2 was transferred through, and sequentially brought into contact with, three preheating rolls and an upstream stretching roll (the surface temperatures of the rolls are respectively controlled to 60 °C, 80 °C, 100 °C, and 110 °C in order). After that, the film being transferred was continuously heated to 137 °C in a hot air furnace including hot air blowing nozzles located above and below the film, and was stretched in the flow direction at a stretch ratio of 3 by using a difference in rotational speed between rolls located upstream and downstream of the hot air furnace. Subsequently, the film was thermally treated at 50 °C by means of a transfer roll controlled to 50 °C. As a result, a stretched film having a thickness of 40 µm and a crystallinity of 62% was obtained. The tensile strength at break of the stretched film is shown in Table 1.

Examples 4 to 6

Stretched films were obtained in the same manner as the stretched film of Example 3, except that the stretch ratio was changed to 4, 5, or 6. The thickness, crystallinity, and tensile strength at break of each stretched film are shown in Table 1.

Examples 7 and 8

Films stretched at a stretch ratio of 2 or 3 were obtained in the same manner as the stretched film of Example 3, except that the thickness of the film web was changed to 80 µm and that the film was heated to 126 °C or 135 °C by using a far-infrared heater located above the film instead of the hot air furnace including hot air blowing nozzles. The thickness, crystallinity, and tensile strength at break of each stretched film are shown in Table 1.

Example 9

Film stretching was performed in the same manner as in Example 1, except that the film temperature during the stretching was changed to 110 °C and the stretch ratio was changed to 1.5. The thickness, crystallinity, and tensile strength at break of the stretched film are shown in Table 1.

Comparative Example 1

Film stretching was performed in the same manner as in Example 1, except that the film temperature during the stretching was changed to 145 °C. The film melted down during the stretching and was not successfully stretched.

Comparative Example 2

Film stretching was performed in the same manner as in Example 1, except that the film temperature during the stretching was changed to 60 °C. Due to insufficient heating of the film, the film broke during the stretching and was not successfully stretched.

TABLE 1

| Uniaxial stretching | | Ex. 1 | Ex. 2 | Ex. 3 | Ex. 4 | Ex. 5 | Ex. 6 |
|---|---|---|---|---|---|---|---|
| Film web | Melting point (° C.) | 146 | 146 | 146 | 146 | 146 | 146 |
| | Film production method | Blown film | T-die | T-die | T-die | T-die | T-die |
| | Blow-up ratio (in blown film molding) | 2.5 | — | — | — | — | — |
| | Thickness (µm) | 70 | 70 | 70 | 70 | 70 | 70 |
| | Crystallinity (%) | 58 | 58 | 58 | 58 | 58 | 58 |
| Stretching | Film temperature (° C.) | 135 | 135 | 137 | 137 | 137 | 137 |
| | Stretch ratio | 2 | 3 | 3 | 4 | 5 | 6 |
| | Heating technique | Hot air 1 | Hot air 1 | Hot air 2 | Hot air 2 | Hot air 2 | Hot air 2 |
| Thermal treatment after stretching | Film temperature (° C.) | 50 | 50 | 50 | 50 | 50 | 50 |
| Stretched film | Thickness (µm) | 27 | 27 | 40 | 30 | 20 | 18 |
| | Crystallinity (%) | 61 | 62 | 62 | 60 | 59 | 61 |
| | Tensile strength at break (MPa) | 76 | 63 | 65 | 67 | 75 | 82 |

| Uniaxial stretching | | Ex. 7 | Ex. 8 | Ex. 9 | Comp. 1 | Comp. 2 |
|---|---|---|---|---|---|---|
| Film web | Melting point (° C.) | 146 | 146 | 146 | 146 | 146 |
| | Film production method | T-die | T-die | Blown film | Blown film | Blown film |
| | Blow-up ratio (in blown film molding) | — | — | 2.5 | 2.5 | 2.5 |
| | Thickness (µm) | 80 | 80 | 70 | 70 | 70 |
| | Crystallinity (%) | 58 | 58 | 58 | 58 | 58 |
| Stretching | Film temperature (° C.) | 126 | 135 | 110 | 145 | 60 |
| | Stretch ratio | 2 | 3 | 1.5 | 2 | 2 |
| | Heating technique | IR heater | IR heater | Hot air 1 | Hot air 1 | Hot air 1 |
| Thermal treatment after stretching | Film temperature (° C.) | 50 | 50 | 50 | — | — |
| Stretched film | Thickness (µm) | 50 | 35 | 39 | Melted down | Broke during stretching |
| | Crystallinity (%) | 61 | 61 | 60 | | |
| | Tensile strength at break (MPa) | 60 | 66 | 60 | | |

Hot air 1: Batch type

Hot air 2: Continuous type

Table 1 reveals that in Examples 1 to 9 where the film stretching was performed under conditions where the film temperature was in the range of temperatures (86 to 141 °C) 5 to 60 °C below the melting point (146 °C), the stretched films were successfully produced at high productivity.

In Comparative Example 1 where the film temperature during the stretching was above the temperature range, the film melted down. In Comparative Example 2 where the film temperature during the stretching was below the temperature range, the film broke due to the stretching, and uneven stretching occurred and resulted in a failure to obtain a uniform stretched film.

insufficient heating of the film, the film broke during the stretching and was not successfully stretched.

Comparative Example 4

Film stretching was performed in the same manner as in Example 11, except that the film temperature during the stretching in the TD direction was changed to 145 °C. The film melted down during the stretching and was not successfully stretched.

TABLE 2

| Biaxial stretching | | Ex. 10 | Ex. 11 | Comp. 3 | Comp. 4 |
|---|---|---|---|---|---|
| Film web | Melting point (° C.) | 146 | 146 | 146 | 146 |
| | Film production method | Blown film | T-die | T-die | T-die |
| | Blow-up ratio (in blown film molding) | 2.5 | — | — | — |
| | Thickness (μm) | 70 | 300 | 300 | 300 |
| | Crystallinity (%) | 58 | 58 | 58 | 58 |
| MD stretching | Film temperature (° C.) | 135 | 135 | 135 | 135 |
| | Stretch ratio | 2 | 2 | 2 | 2 |
| TD stretching | Film temperature (° C.) | 120 | 120 | 60 | 145 |
| | Stretch ratio | 2 | 2 | 2 | 2 |
| Thermal treatment after stretching | Film temperature (° C.) | 50 | 50 | — | — |
| Biaxially-stretched film | Thickness (μm) | 15 | 50 | Broke during TD stretching | Melted down during TD stretching |
| | Crystallinity (%) | 62 | 62 | | |
| | Tensile strength at break (MPa) MD direction/TD direction | 62/62 | 62/62 | | |

Example 10

First, a uniaxially-stretched film was obtained in the same manner as the stretched film of Example 1.

The obtained uniaxially-stretched film was cut to prepare a test specimen having a size of 100 mm×100 mm. The test specimen with all of its four sides held was placed into a hot air oven, in which the test specimen was stretched in the TD direction at a speed of 400 mm/min and a stretch ratio of 2 while the film temperature was maintained at 120 °C. Thus, a biaxially-stretched film was obtained.

After that, the obtained film was thermally treated at 50 °C. As a result, a biaxially-stretched film having a thickness of 15 μm and a crystallinity of 62% was obtained. The tensile strengths at break of the obtained biaxially-stretched film in the MD and TD directions are shown in Table 2.

Example 11

A film web having a thickness of 300 μm and a crystallinity of 58% was obtained in the same manner as the film web of Example 2.

The obtained film web was biaxially stretched in the same manner as in Example 10. As a result, a biaxially-stretched film having a thickness of 50 μm and a crystallinity of 62% was obtained. The tensile strengths at break of the obtained biaxially-stretched film in the MD and TD directions are shown in Table 2.

Comparative Example 3

Film stretching was performed in the same manner as in Example 11, except that the film temperature during the stretching in the TD direction was changed to 60 °C. Due to Table 2 reveals that in Examples 10 and 11 where the film stretching in the TD direction was performed under conditions where the film temperature was in the range of temperatures (86 to 141 °C) 5 to 60 °C below the melting point (146 °C), the biaxially-stretched films were successfully produced at high productivity.

In Comparative Example 3 where the film temperature during the stretching in the TD direction was below the temperature range, the film broke due to the stretching. In Comparative Example 4 where the film temperature during the stretching in the TD direction was above the temperature range, the film melted down.

REFERENCE SIGNS LIST

11 feed roll
21 film web
22 stretched film
12 take-up roll
31, 32, 33 preheating roll
34 upstream stretching roll
35 downstream stretching roll
36, 37 thermal treatment roll
A heating zone
A1 upper nozzle
A2 lower nozzle

The invention claimed is:

1. A method for producing a stretched film by stretching a film web containing a poly(3-hydroxybutyrate) resin, the method comprising:

stretching the film web under conditions where a film surface maximum temperature is within a temperature range represented by the following inequality (1):

$$Tm-60 \leq \text{film surface maximum temperature } (^\circ\text{C}) \leq Tm-5, \quad (1)$$

wherein the Tm is a melting point (°C) of the film web, and the film web has a crystallinity of more than 40% to 58%.

2. The method according to claim 1, wherein the temperature range represented by the inequality (1) is a temperature range represented by the following inequality (2):

$$Tm-30 \leq \text{film surface maximum temperature } (^\circ\text{C}) \leq Tm-5. \quad (2)$$

3. The method according to claim 1, wherein the stretched film has a crystallinity of more than 40% to 62%.

4. The method according to claim 1, wherein the stretched film has a crystallinity of 50% to 62%.

5. The method according to claim 1, wherein during the stretching, the film web is heated to control the film surface maximum temperature within the temperature range.

6. The method according to claim 5, wherein the heating is performed using at least one non-contact heating technique selected from the group consisting of hot air heating and infrared radiation heating.

7. The method according to claim 6, wherein the hot air heating is floating-type heating.

8. The method according to claim 6, further comprising preheating the film web to a temperature lower than the film surface maximum temperature before performing the non-contact heating technique.

9. The method according to claim 5, wherein the heating is performed by heating a roll to a temperature within the temperature range and bringing the heated roll into contact with the film web.

10. The method according to claim 1, wherein the stretching is performed by using a plurality of rolls on which the film web is transferred and by operating the plurality of rolls at different rotational speeds.

11. The method according to claim 1, wherein a stretch ratio achieved by the stretching is from 1.1 to 8.

12. The method according to claim 1, wherein the film web is a film produced by blown film molding.

13. The method according to claim 12, wherein a blow-up ratio in the blown film molding is at least 2.

14. The method according to claim 1, wherein the film web is a film produced by T-die extrusion molding.

15. The method according to claim 1, wherein the poly(3-hydroxybutyrate) resin comprises poly(3-hydroxybutyrate-co-3-hydroxyhexanoate).

16. The method according to claim 1, wherein the stretched film is a biaxially-stretched film, the method comprises (i) stretching the film web in a given direction, and (ii) stretching the film web in a direction perpendicular to the given direction, and in (ii), the stretching is performed under conditions where the film surface maximum temperature is within the temperature range represented by the inequality (1).

17. The method according to claim 16, wherein (i) is performed under conditions where a film surface maximum temperature is within a temperature range represented by the following inequality (1):

Tm-60≤film surface maximum temperature (°C)≤Tm-5 (1), wherein the Tm is a melting point (°C) of the film web.

18. The method according to claim 16, wherein (i) and (ii) are performed sequentially or simultaneously.

19. The method according to claim 1, wherein the poly(3-hydroxybutyrate) resin comprises a copolymer of 3-hydroxybutyrate and another hydroxyalkanoate.

20. A method for producing a stretched film by stretching a film web containing a poly(3-hydroxybutyrate) resin, the method comprising:

stretching the film web under conditions where a film surface maximum temperature is within a temperature range represented by the following inequality (1):

$$Tm-60 \leq \text{film surface maximum temperature } (^\circ\text{C}) \leq Tm-5, \quad (1)$$

wherein the Tm is a melting point (°C) of the film web, and the film web has a crystallinity of more than 40% to 80%, wherein the stretched film has a crystallinity of more than 40% to 62%.

* * * * *